US008359825B2

(12) United States Patent
Alvi

(10) Patent No.: US 8,359,825 B2
(45) Date of Patent: Jan. 29, 2013

(54) MICROJET CREATION AND CONTROL OF SHOCK WAVES

(75) Inventor: Farrukh S. Alvi, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 634 days.

(21) Appl. No.: 12/454,587

(22) Filed: May 20, 2009

(65) Prior Publication Data

US 2009/0288711 A1 Nov. 26, 2009

Related U.S. Application Data

(60) Provisional application No. 61/128,330, filed on May 21, 2008.

(51) Int. Cl.
*F02K 1/28* (2006.01)
*F02K 9/82* (2006.01)

(52) U.S. Cl. ............... 60/204; 60/768; 60/779; 60/231; 244/204; 244/207; 137/15.2

(58) Field of Classification Search .................... 60/231, 60/365, 768, 39.091, 779, 204; 244/1 N, 244/204, 207, 53 B; 137/15.1, 15.2, 10
See application file for complete search history.

(56) References Cited

U.S. PATENT DOCUMENTS

| 2,906,089 | A | * | 9/1959 | Bertin et al. ................. 137/15.1 |
| 3,218,801 | A | * | 11/1965 | Vasu ............................... 60/243 |
| 3,642,017 | A | * | 2/1972 | Homes .......................... 137/818 |
| 5,220,787 | A | * | 6/1993 | Bulman ........................... 60/768 |
| 6,260,567 | B1 | * | 7/2001 | Gruensfelder et al. ........... 137/1 |
| 6,837,456 | B1 | * | 1/2005 | Shih et al. .................... 244/12.1 |
| 2006/0202082 | A1 | * | 9/2006 | Alvi ............................ 244/12.1 |

* cited by examiner

*Primary Examiner* — Ted Kim
*Assistant Examiner* — Andrew Nguyen
(74) *Attorney, Agent, or Firm* — J. Wiley Horton

(57) ABSTRACT

A method of using one or more microjets to create and/or control oblique shock waves. The introduction of microjet flow into a supersonic stream creates an oblique shock wave. This wave can be strengthened—by increasing microjet flow rate or the use of many microjets in an array—in order to form an oblique shock. Such an oblique shock can be used to decelerate flow in a jet aircraft engine inlet in a controlled fashion, thus increasing pressure recovery and engine efficiency while reducing flow instability. Adjusting the pressure ratio across the microjet actually alters the angle of the oblique shock. Thus, the use of microjets allows decelerating shock waves in an inlet engine to be properly positioned and controlled. Microjet arrays can also be used to ameliorate shock waves created by external aircraft surfaces, such as sensor pods and weapons. Microjets placed forward of any external protuberance can convert a single substantial shock wave into a series of much milder waves which will not produce unwanted external effects, such as strong sonic booms.

2 Claims, 11 Drawing Sheets

(A)

(B)

MICROJET CREATION AND CONTROL OF SHOCK WAVES

CROSS-REFERENCES TO RELATED APPLICATIONS

This application is a non-provisional application claiming the benefit, pursuant to 37 C.F.R. §1.53 (c), of an earlier-filed provisional application. The provisional application was filed on May 21, 2008 and was assigned application Ser. No. 61/128,330.

STATEMENT REGARDING FEDERALLY SPONSORED RESEARCH OR DEVELOPMENT

Not applicable.

MICROFICHE APPENDIX

Not Applicable

BACKGROUND OF THE INVENTION

1. Field of the Invention

This invention relates to the field of flow control in a compressible flow. More specifically, the invention comprises the use of properly placed microjets to create and/or control shock waves in supersonic flow.

2. Description of the Related Art

Shock waves are created whenever an object moves through a compressible fluid at a velocity equal to or greater than the speed of sound in the compressible fluid. Compressible flow in air is of obvious interest, and this application deals primarily with that medium.

Shock wave creation influences many areas of aircraft design. Such waves have a substantial impact on flow over the control surfaces and flow feeding into the powerplant. Effects of the shock waves far away from the aircraft are also a concern. Shock waves striking the ground create a "sonic boom," which may at best cause annoyance and at worst cause actual damage. In the military context, shock waves may also alert an enemy to the presence of an aircraft which has low visual and radar observability.

The nature of shock waves in the inlets of jet aircraft engines has been thoroughly studied, though the control of such waves has not been thoroughly developed. Those skilled in the art will know that a turbojet can only ingest subsonic air flow. Thus, the duct feeding air into the engine (commonly referred to as an "inlet") must decelerate the incoming air in a controlled fashion. FIG. 1 shows an idealized prior art inlet 10. It has three main regions spanning the distance between intake 14 and engine compressor 12. These are compression section 18, throat 20, and subsonic diffuser 22.

Supersonic flow passing a discontinuity creates an oblique shock wave—the severity of which depends largely upon the orientation of the discontinuity with respect to the flow (with a more aligned obstruction creating a less severe shock). Oblique shocks 16 are created within compression section 18. These decelerate the flow to a lower Mach number. The oblique shock waves tend to reflect from the contracting walls of the compression section, creating additional deceleration.

During proper operation, the inlet is designed to position normal shock 17 in the vicinity of throat 20. The normal shock is characterized by slightly supersonic flow just upstream and slightly subsonic flow just downstream (typically about Mach 1.3 upstream and about Mach 0.9 downstream). Subsonic diffuser 22 leads from the throat to engine compressor 12. The subsonic flow in this region decelerates as the cavity walls expand. Thus, the flow is further decelerated to well below the speed of sound prior to entering the engine.

The flow within the subsonic diffuser generally obeys Bernoulli's equation in areas away from solid surfaces and where viscous effects are negligible. Such flow is generally predictable (though subsonic compressible flow may often be regarded as counterintuitive). The flow entering and passing through the compression section is more complex, more variable, and more difficult to predict. An effective supersonic inlet design must be able to pass through a wide range of flow states. It must pass from a zero flow state when the engine is started on the ground, through the transonic region, and into supersonic flow.

The shock waves must be created in the correct regions in order for the inlet to perform properly. "Inlet start" refers to the transonic process where the shock waves are established and stabilized. The creation of a stable normal shock in the right position is no small task. In fact, variable incoming and engine flow states may cause "inlet unstart," a phenomenon wherein the normal shock travels forward into the compression section and may even be ejected out the front of the intake. Such a condition produces drastic flow losses and may flame out the engine.

When the normal shock is in the vicinity of the throat, so that all the subsonic flow lies within the diffuser, the inlet is generally passing the maximum flow. Its operation at this point is said to be critical, which is the desired optimal operating condition. If the normal shock moves aft toward the compressor, the operation is described as supercritical. The flow velocities may be even higher in the supercritical state but the pressure recovery will be reduced, which is generally undesirable.

When the normal shock moves forward toward the intake the operation is described as subcritical. In this state, the inlet is attempting to pass more air than the engine needs. This is generally a dangerous condition since it may cause intake unstart. Bleed flaps or other features upstream of the throat typically remedy such a problem by passing some portion of the intake air around the engine.

Compression inlets have generally been divided into three categories—external compression inlets, internal compression inlets, and mixed compression inlets. External compression inlets locate the oblique shock(s) ahead of the intake. Internal compression inlets locate the oblique shock(s) entirely inside the inlet. Mixed compression inlets have some portion of the oblique shock(s) outside the inlet and some inside the inlet. The spike and cone system on Lockheed's SR-71 Blackbird is an example of an external compression inlet. Most currently produced supersonic aircraft used mixed compression inlets.

The reader will thereby appreciate that the fixed geometry of FIG. 1 will not function in a real aircraft. The fixed geometry shown will only function for a relatively small range of supersonic speeds. It will not serve for subsonic flight, transonic flight, or supersonic flight outside the range. Movable geometry has traditionally been employed to address these concerns.

FIGS. 2 and 3 show two examples of moving inlet geometry, among the many variants known in the art. FIG. 2 shows the diverter/ramp approach. This approach was used on aircraft such as the McDonnell Douglas F-4 Phantom II and the Republic F-105 Thunderchief. Both these aircraft use a pair of inlets lying on either side of the cockpit. FIG. 2(A) corresponds to a "plan view" looking down on one of the aircraft's inlets from above. Boundary layer diverter 26 is a fixed plate mounted a small distance away from fuselage 24. It prevents the turbulent boundary layer air from flowing into the engine(s). FIG. 2(A) shows the subsonic configuration. Adjustable ramp 28 is folded flat against the fuselage, allowing a large intake area. The air flows between the adjustable ramp and lip 34. A compression section, throat and subsonic diffuser are provided before the air reaches engine compressor 12.

FIG. 2(B) shows the geometry set for the supersonic state. Adjustable ramp 28 has been rotated outward—away from the fuselage. First oblique shock 30 is formed by the leading edge of boundary layer diverter 24. Second oblique shock 32 forms at the intersection of the boundary layer diverter and the adjustable ramp. The reader will observe how the position of the adjustable ramp and the shape of outer wall 36 combine to create a converging-diverging path similar to the fixed geometry of FIG. 1. However, since the ramp angle can be changed, the geometry is variable and can function over a broad speed range.

The reader will also observe that both oblique shocks pass to the outside of lip 34. These therefore propagate outside the aircraft. As the shocks in the inlet geometry can be quite strong, the propagation of these waves outside the aircraft contributes to the creation of sonic booms. The state depicted is the low-supersonic region. It has traditionally thought to be desirable to place at least one oblique shock outside the intake so that some decelerated spill flow could pass around the intake. Concerns about sonic booms obviously make this approach less desirable.

FIG. 3 shows another type of variable inlet geometry, such as is found on Grumman's F-14 Tomcat. The view corresponds to an elevation view, looking at one of the aircraft's inlets from the side. Leading lip 33 extends far ahead of trailing lip 35. Two "ramps" are positioned within the inlet—leading ramp 40 and trailing ramp 42. Bleed flap 38 opens and closes to allow some air to bypass the engine—which is located to the right of the geometry shown in the view. FIG. 3(A) shows the subsonic state, in which both ramps are drawn up to the roof of the inlet. A gap between the ramps can be adjusted to allow a certain portion of the air flow to be exhausted through bleed flap 38.

FIG. 3(B) shows the supersonic configuration. The two ramps have been lowered to form throat 20 and subsonic diffuser 22. Leading lip 33 forms first oblique shock 30. Successive oblique shocks are formed by the intersection with leading ramp 40. The throat is formed by the portion of the inlet just behind trailing lip 35 and the repositioned ramps. Some bleed air may still be redirected out through bleed flap 38 in order to properly position the normal shock.

The ramp geometries are typically hydraulically controlled and they can be moved rapidly. Sensors within the inlet—generally pressure sensors and sometimes temperature and flow sensors—monitor the inlet condition. This condition is compared to the engine state in order to properly configure the inlet geometry. All this is done automatically. The reader will note that the oblique shocks in the F-14 inlet are external and propagate beyond the aircraft.

Similar geometry is used on the McDonnell Douglas F-15 Eagle. However, the F-15 incorporates the additional innovative feature of a moving leading lip. The leading lip can be moved forward and downward to reposition the oblique shocks and change the cross section of intake area which is "presented" to the incoming flow. This approach has certain advantages but—as for the Tomcat—oblique shocks are propagated outside the aircraft.

Another factor of great recent interest is radar observability. Most external aircraft features can now be designed to minimize radar reflection. However, the spinning compressor blades produce a strong radar reflection. If any portion of the compressor is visible from the front of the aircraft, the compressor may well be the strongest radar reflection in the entire aircraft. The reader will note that the prior art geometries only partially obscure the compressor. It is therefore desirable to provide a serpentine inlet which will hide the compressor, such as is done in the F-22 Raptor.

A serpentine inlet 10 is shown in FIG. 11. A radar wave entering intake 14 does not directly "see" the plane of engine compressor 12. However, if moving ramps are used in this intake, they may well be visible to radar when deployed. The objective of low observability introduces new flow control concerns, which the present invention may help to address.

As mentioned previously, a mixed compression inlet tends to produce an external oblique shock and a resulting sonic boom. Of course, sonic booms are created by many features outside the engine inlets. FIG. 4 shows the forward portion of an aircraft experiencing supersonic flow. The nose of the aircraft creates a significant shock wave which is a blended combination of bow shock 80 (a normal shock) and oblique shock 16. In addition, every perturbation in the aircraft's surface creates an oblique Mach wave. The joint between the canopy and the fuselage is one good example—"canopy shock" being a thoroughly studied phenomenon. Protuberance 25 on the underside of the fuselage likewise creates an oblique shock.

The mitigation and/or control of shock waves emanating from an aircraft's external structure is a desirable goal. The present invention seeks to create shock waves in desired locations and to control the position and severity of a variety of shock waves. It can be used to control flow and to lessen external effects such as the creation of sonic booms.

BRIEF SUMMARY OF THE INVENTION

The present invention comprises the use of one or more microjets to create and/or control oblique shock waves. The introduction of microjet flow into a supersonic stream creates an oblique Mach wave. This wave can be strengthened—by increasing microjet flow rate or the use of many microjets in an array—in order to form an oblique shock. Such an oblique shock can be used to decelerate flow in a jet aircraft engine inlet in a controlled fashion. Adjusting the pressure ratio across the microjet actually alters the angle of the oblique shock. Thus, the use of microjets allows decelerating shock waves in an inlet engine to be properly positioned and controlled.

Microjet arrays can also be used to ameliorate shock waves created by external aircraft surface protuberances, such as sensor pods and weapons. Microjets placed forward of any external protuberance can convert a single substantial shock wave into a series of much milder waves which will not produce unwanted external effects.

Figure 1:
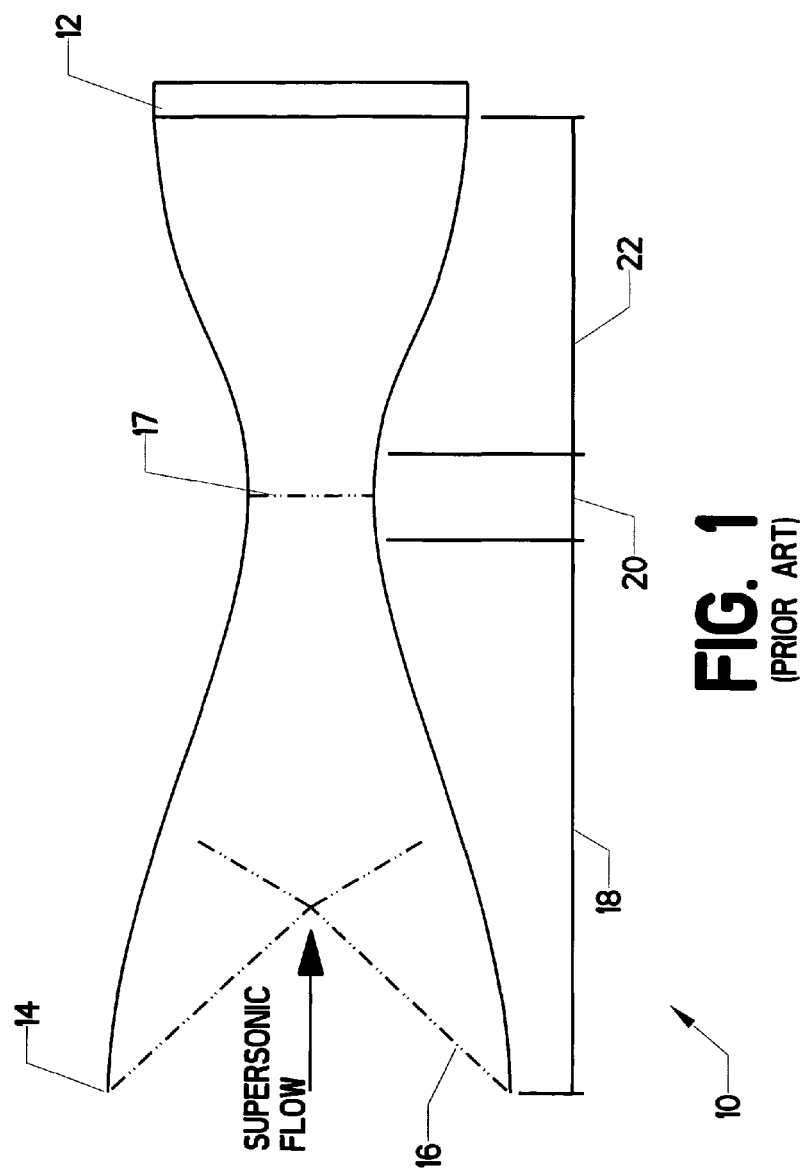
FIG. 1 is a schematic plan view, showing a theoretical engine inlet having a fixed geometry.

| REFERENCE NUMERALS IN THE DRAWINGS | | | |
|---|---|---|---|
| 10 | inlet | 12 | engine compressor |
| 14 | intake | 16 | oblique shock |
| 17 | normal shock | 18 | compression section |
| 20 | throat | 22 | subsonic diffuser |
| 24 | fuselage | 25 | protuberance |
| 26 | boundary layer diverter | 28 | adjustable ramp |
| 30 | first oblique shock | 32 | second oblique shock |
| 33 | leading lip | 34 | lip |
| 35 | trailing lip | 36 | outer wall |
| 38 | bleed flap | 40 | leading ramp |
| 41 | control valve | 42 | trailing ramp |
| 43 | pressure ratio sensor | 44 | microjet |
| 45 | pressure sensor | 46 | settling chamber |
| 48 | barrel shock | 50 | Mach disk |
| 52 | interaction shock | 53 | boundary layer |
| 54 | microjet array | 60 | trailing microjet array |
| 62 | middle microjet array | 64 | leading microjet array |
| 80 | bow shock | | |

DETAILED DESCRIPTION OF THE INVENTION

Figure 5:
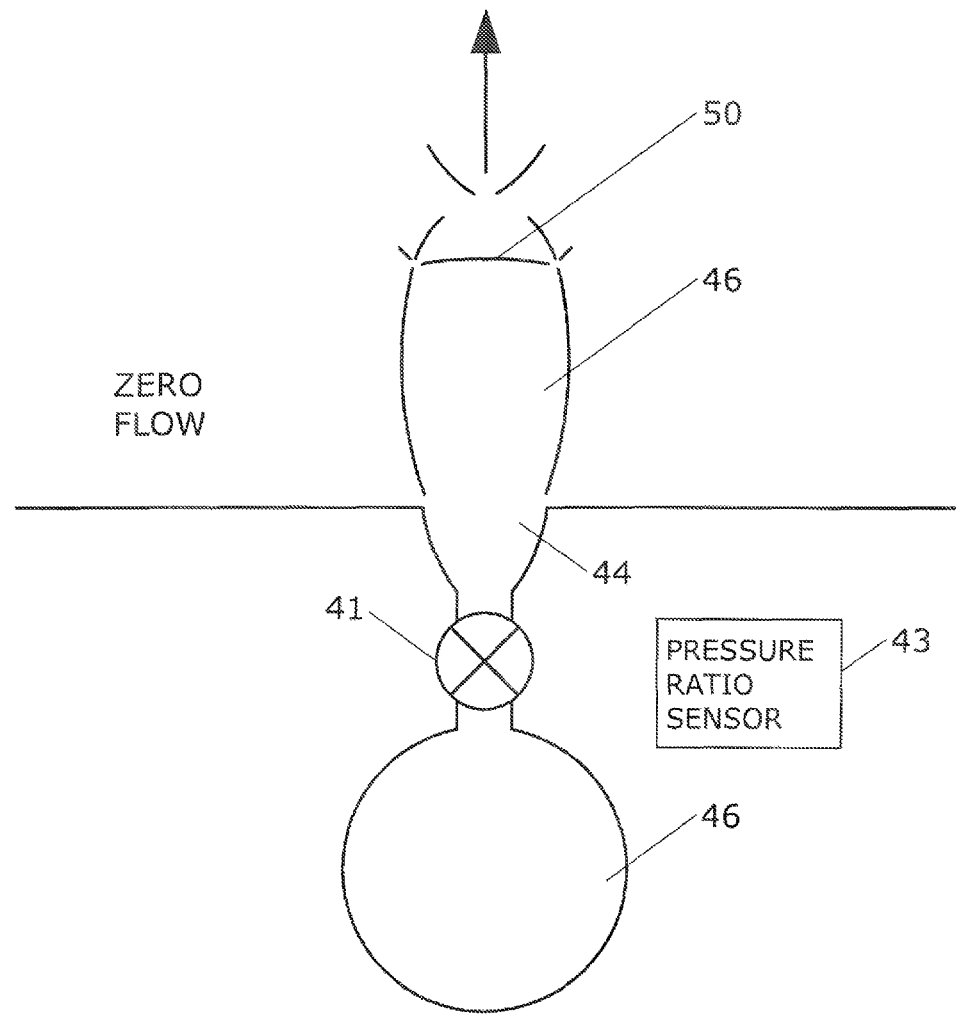
FIG. 5 is a sectioned elevation view, showing a microjet discharging into stagnant air.

The present invention contemplates the injection of relatively small masses of compressed fluid through one or more microjets. A microjet is defined as a small expansion nozzle. A typical size is a diameter of 400 micrometers, or about 0.016 inches. FIG. 5 shows a sectional elevation view of a single microjet 44. Settling chamber 46 provides a volume of pressurized gas (such as nitrogen or air). Microjet 44 is a very small expansion nozzle which vents the pressurized gas to the surrounding atmosphere. The microjet preferably has a shape such as shown (a DeLaval expansion profile) but may also have a simpler profile including straight side walls. The input stagnation pressure to each microjet or array of microjets is preferably controlled within a reasonable variation. As one example—suited to a particular application—the stagnation pressure could be controlled within a tolerance of about 7 kPa or 1 psi. The microjet is shown as normal to the surface it vents through, which is an effective configuration. However, in some circumstances, it may be desirable to tilt the microjet. Control valve 41 is used to selectively turn the microjet on and off. Pressure sensor 45 determines the ambient pressure of the supersonic flow, said pressure being represented in FIG. 5 by P. Pressure ratio sensor 43 determines the ratio of the ambient pressure of the supersonic flow to the pressure of the compressible gas, said pressure being represented by $P_0$, being supplied to settling chamber 46. The ratio of the pressures can be modified by adjusting the pressure of the compressible gas.

The microjet ejects the working fluid at supersonic speeds. Barrel shock 48 is formed near the microjet's opening to the ambient atmosphere. Mach disk 50 (a normal shock) forms at the top of the barrel shock. Curving oblique waves extend thereafter as the flow continues to decelerate through the stagnant air.

The microjet flow depicted in this particular example is obviously supersonic. The streamwise length of the microjet plume extends to about 6 to 12 times the diameter of the microjet orifice, depending on the operating conditions. The length of the plume increases with increasing pressure drop across the microjet. The distance to the Mach disk also increases. The behavior of such a supersonic microjet is—at least grossly—similar to the behavior of larger supersonic jets.

Figure 6:
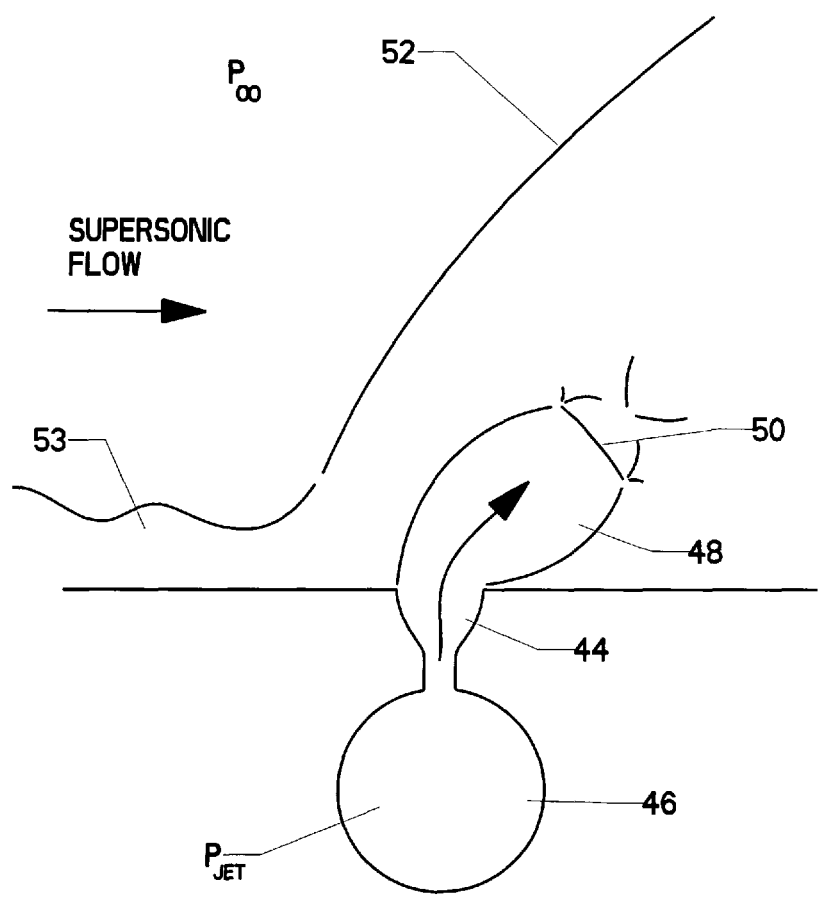
FIG. 6 is a sectioned elevation view, showing a microjet discharging into supersonic flow.

If the microjet flow is ejected into a rapidly moving flow, a different effect results. FIG. 6 shows the use of a microjet to inject flow in a direction which is substantially perpendicular to a prevailing supersonic flow. Boundary layer 53 flows along the solid surface. The microjet penetrates into this boundary layer flow and, for certain conditions, penetrates into the freestream flow. The reader will observe how barrel shock 48 and Mach disk 50 are deflected by the prevailing flow.

Figure 7:
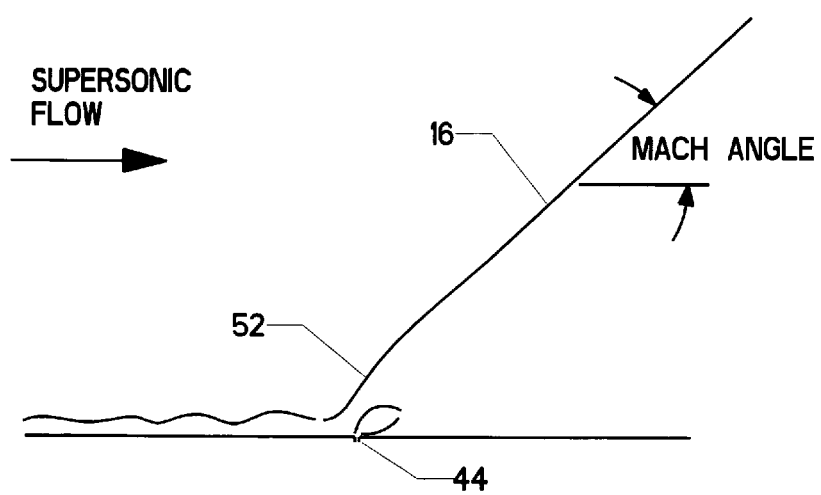
FIG. 7 is an elevation view, showing how a microjet discharging into supersonic flow creates an oblique shock wave.

Interaction shock 52 is created. FIG. 7 shows the same scenario from a more global viewpoint. Interaction shock curves into and forms oblique shock 16. The oblique shock has a fixed angle in the vicinity of the microjet, as shown in the view. The shock angle is of course dependent upon the speed of the supersonic flow. However, the shock angle is also dependent upon the ratio of the working fluid within settling chamber 46 to the ambient pressure ($P_{JET}/P_\infty$). As this ratio is changed, the shock angle changes. Increasing the ratio increases the shock angle, while decreasing the ratio decreases the shock angle. In fact, increasing the pressure ratio from 5 to 25 can vary the shock angle by more than 5 degrees, which is a significant variation. Those skilled in the art will know that jet engine compressor bleed air is able to supply air at these pressure ratios.

As one example, in a Mach 2 flow, varying the pressure ratio can adjust the shock angle from 33 degrees to 39 degrees. The table presented below presents data for a Mach 2 flow with differing pressure ratios. "Beta" is the angle of the resulting oblique shock, while "Theta" is the degree of flow direction change in the flow passing through the shock.

TABLE I

| $M_1$ | $P_{JET}/P_\infty$ | $\beta(°)$ | $M_2$ | $\theta(°)$ |
|---|---|---|---|---|
| 2.0 | 1.00 | 30.0 | 2.0 | 0.0 |
| 2.0 | 8.68 | 34.6 | 1.8 | 5.3 |
| 2.0 | 13.68 | 36.3 | 1.8 | 7.1 |
| 2.0 | 18.68 | 38.4 | 1.7 | 9.2 |
| 2.0 | 23.68 | 39.6 | 1.6 | 10.3 |
| 2.0 | 28.68 | 40.4 | 1.6 | 11.0 |

Figure 8:
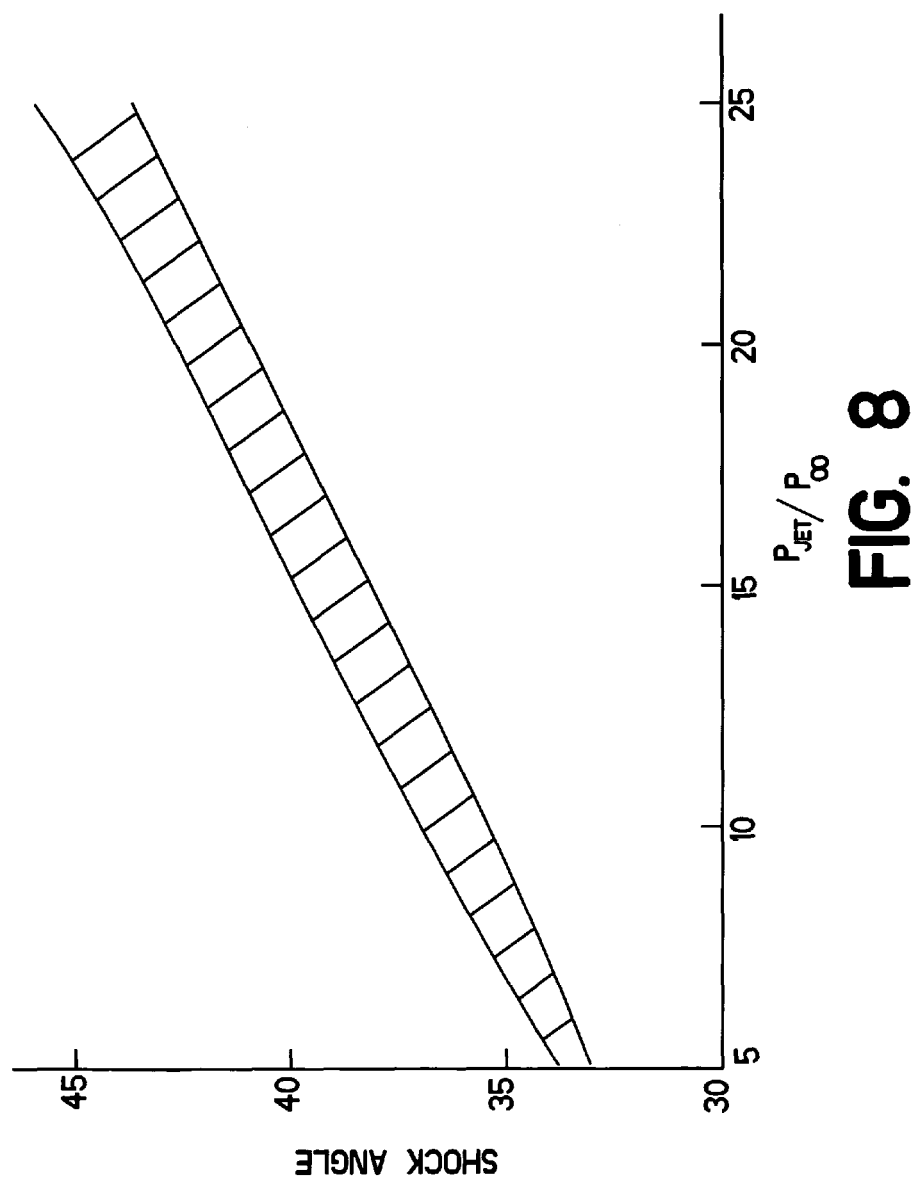
FIG. 8 is a plot of shock angle versus microjet pressure ratio, showing how varying the microjet pressure ratio can alter the shock angle.

FIG. 8 shows a plot of shock angle versus the microjet pressure ratio (for a given supersonic speed). The effect is not constant. It depends somewhat on the surrounding geometry. Thus, the plot shows a range of shock angles rather than a specific value. The reader will thereby appreciate that by varying the pressure ratio of the microjet one can "fine tune" the angle of the resulting oblique shock wave.

Figure 4:
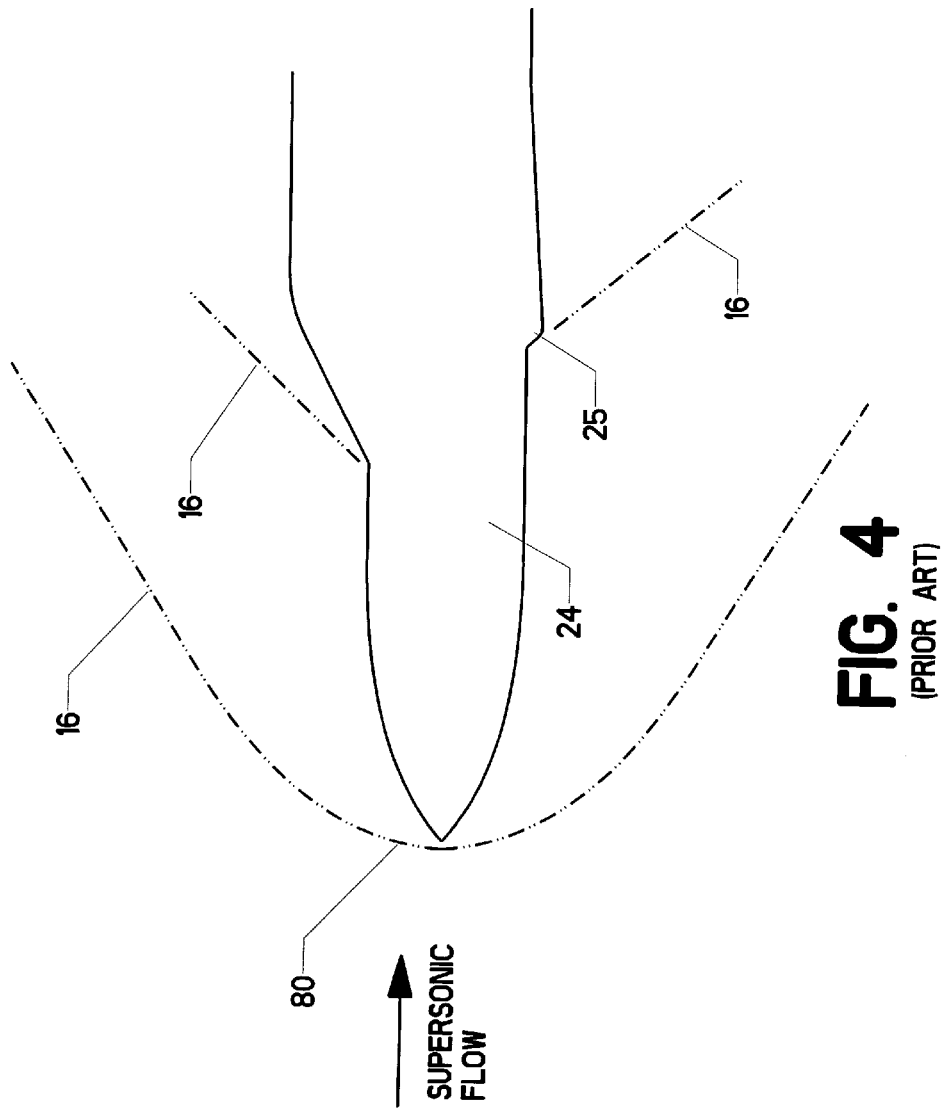
FIG. 4 is an elevation view, showing the nose of an aircraft in supersonic flight.
Figure 9:
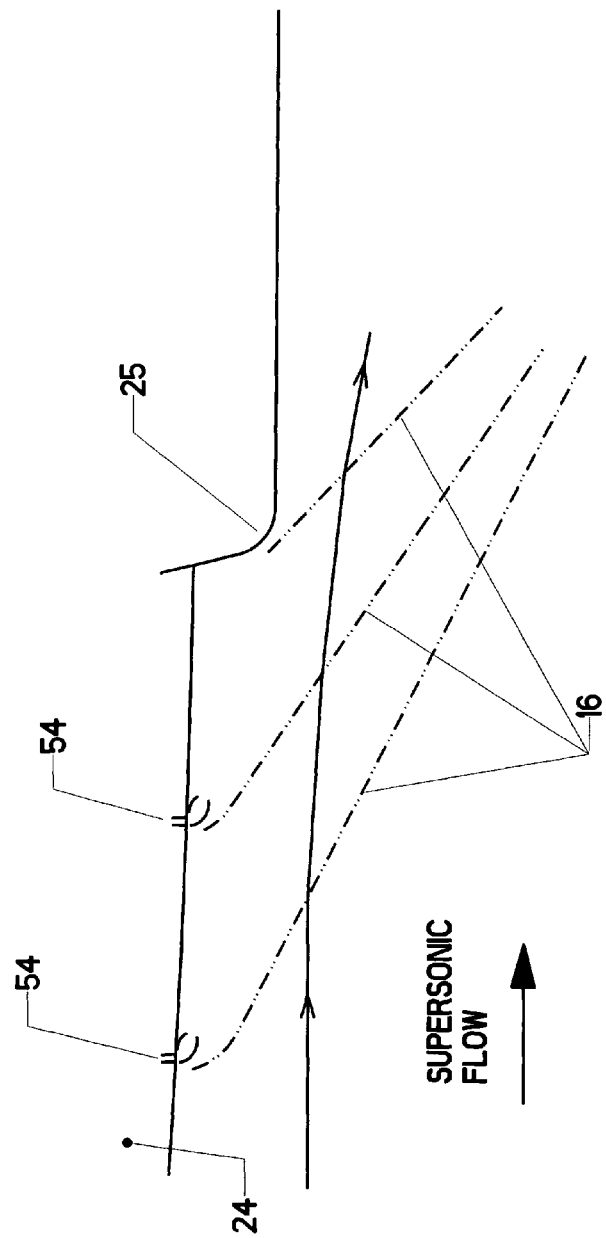
FIG. 9 is a schematic plan view, showing the use of microjet arrays to lessen the oblique shock produced by a protuberance.
Figure 10:
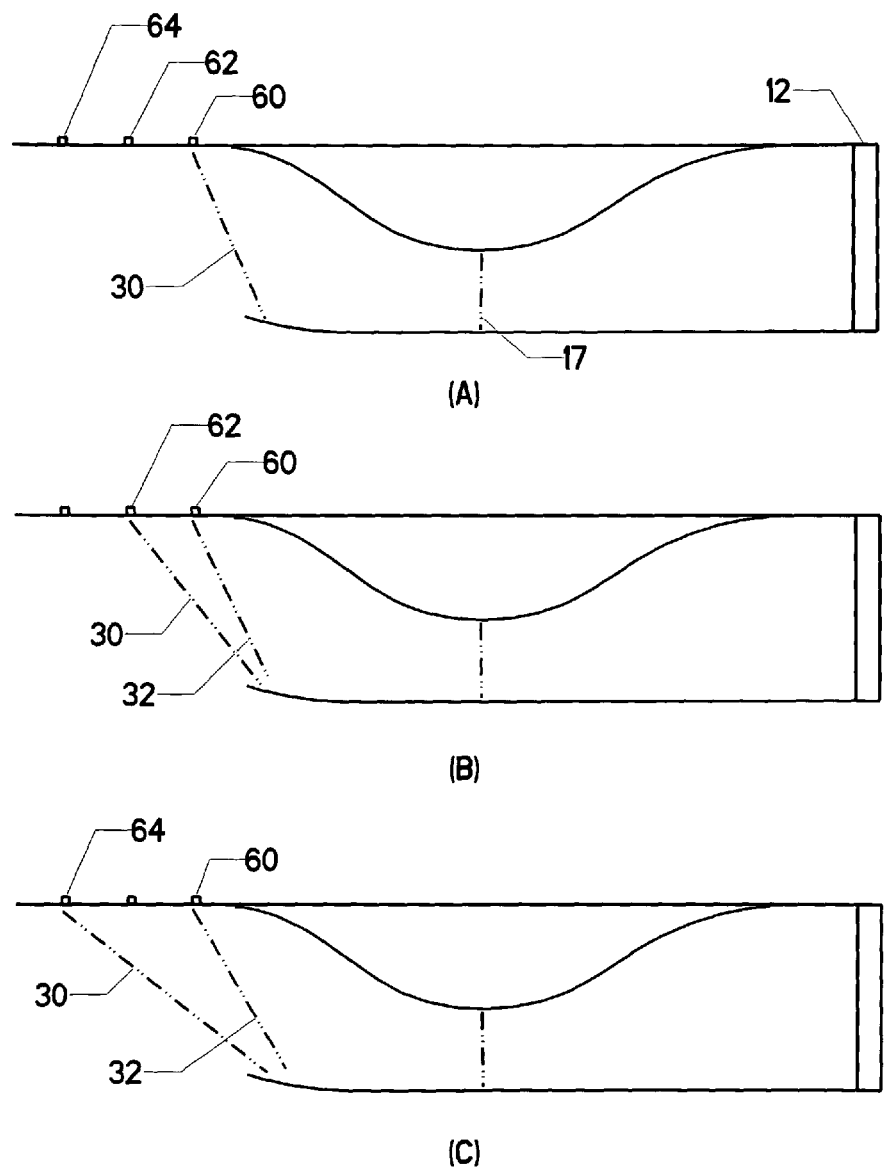
FIG. 10 is a schematic plan view, showing the use of microjet arrays to control flow in an engine inlet.
Figure 11:
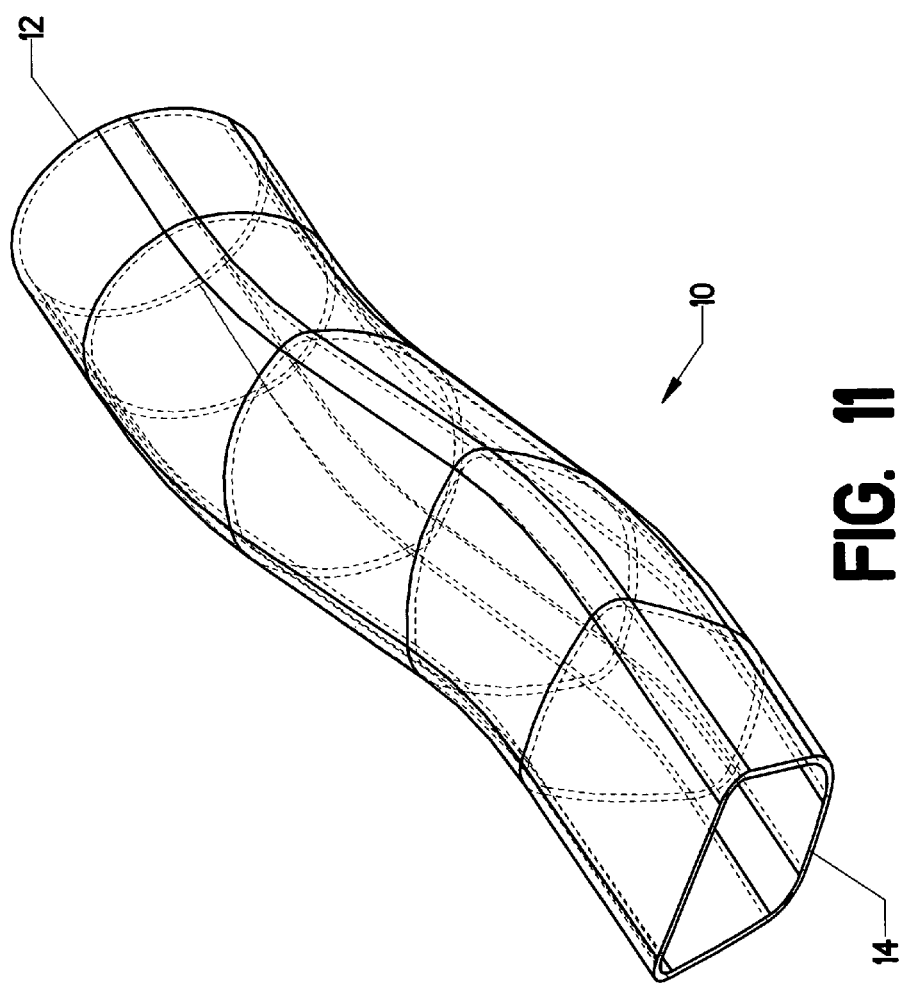
FIG. 11 is a perspective view, showing a serpentine inlet such as is used on low-observable aircraft.

Many applications for this technology are possible. FIGS. 9 and 10 provide basic explanations of two such applications. FIG. 9 shows a detail view of the aircraft fuselage of FIG. 4, focusing on protuberance 25. Ordinarily the boundary layer would pass along the fuselage before encountering the protuberance. A relatively strong oblique shock would result. In FIG. 9, however, two microjet arrays 54 have been placed ahead of the protuberance. A microjet array can assume many forms. One good example is the use of a plurality of closely spaced microjets oriented approximately perpendicular (within about 10 degrees of perfectly normal) to the direction of the flow.

The first microjet array is turned on and produces a leading oblique shock 16. The second microjet array likewise produces an oblique shock, as does the protuberance itself. The result is that the flow shock created by the protuberance is spread across three relatively mild shock waves rather than one strong one. The flow is turned more gradually as it passes through the three mild oblique shocks rather than a single strong one. The flow is graphically depicted as a streamline passing through the weak shocks. The reader will observe how the streamline is turned slightly as it passes through each shock. The pressure rise across each of these waves is much lower and the resulting external noise ("sonic boom") is thereby reduced.

Such microjet arrays can be placed in many areas around the aircraft to ameliorate harsh shock formation. The flow volume can easily be met by bleeding some air from the compressor of the jet engine. Given that the mass flow through such microjets is very small, almost negligible, the bleed flow required for this system should have a negligible impact on the overall propulsion system (and may in fact have no measurable impact at all).

Figure 2:
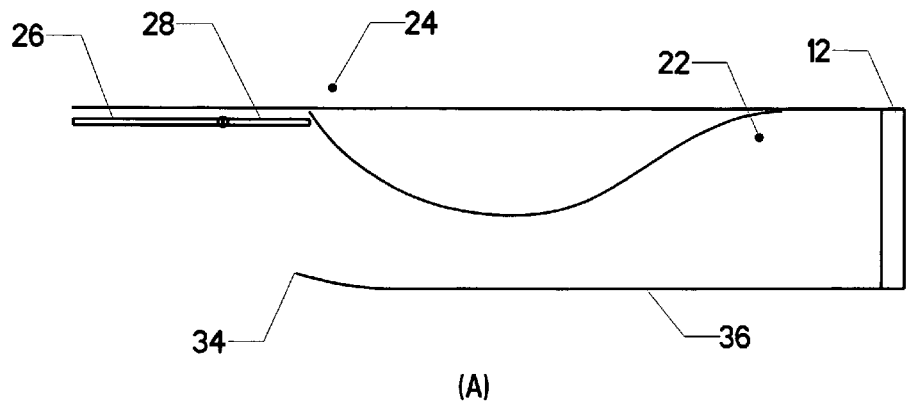
FIG. 2 is a schematic plan view, showing en engine inlet having a diverter and an adjustable ramp, with the ramp being positioned for subsonic and supersonic flow.
Figure 2:
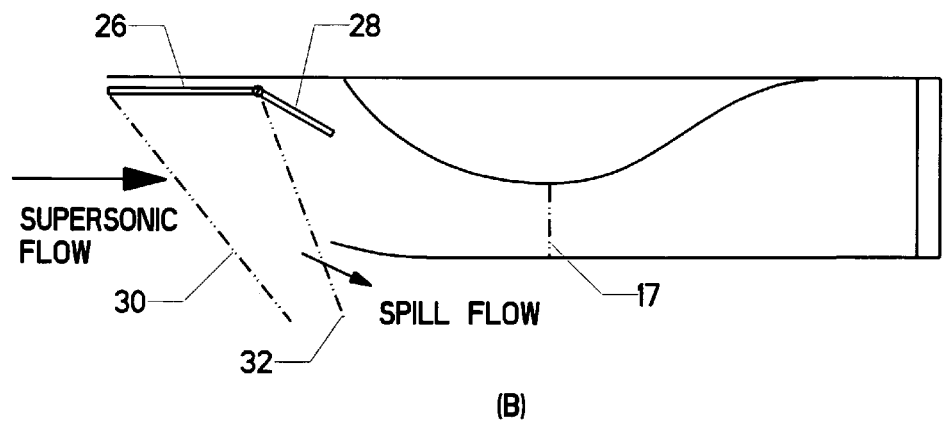
Figure 3:
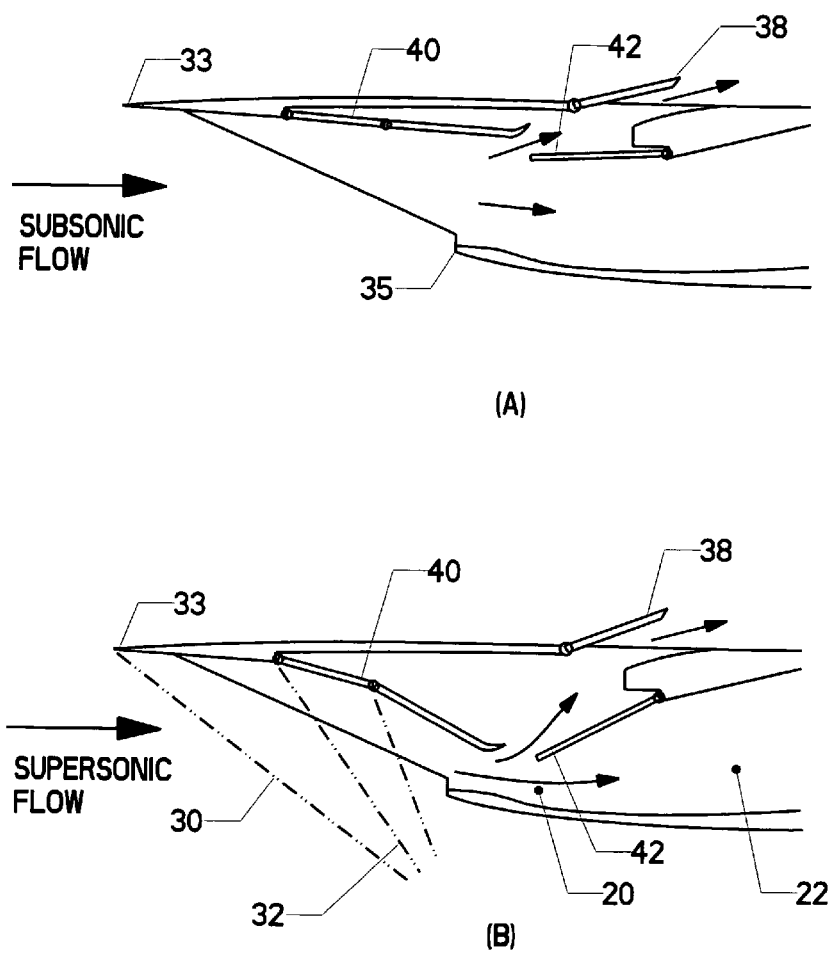
FIG. 3 is a schematic elevation view, showing an engine inlet having a leading and trailing ramp, with the ramps being positioned for subsonic and supersonic flow.

FIG. 10 shows the use of microjet arrays in an engine inlet. The inlet shown is representative, as the microjets could be applied to many different inlet types. It is analogous to the inlet geometry of FIG. 2, except that microjet arrays have been substituted for the diverter and adjustable ramp. The view is a plan view, looking down on an aircraft fuselage and one side inlet. Three microjet arrays are present—leading microjet array 64, middle microjet array 62, and trailing microjet array 60. Each array is a plurality of microjets oriented transversely to the flow. The microjets may be in a line, or may be in some other configuration (such as a staggered line having a depth of two or more microjets with respect to the flow direction).

FIG. 10(A) shows the inlet's operation under slightly supersonic conditions. Trailing microjet array 60 has been activated, resulting in first oblique shock 30. The pressure ratio across the microjet array is adjusted so that the trailing end of the first oblique shock lies inside lip 34. Normal shock 17 is stabilized in the throat area.

FIG. 10(B) shows the same geometry under faster flow conditions. Middle microjet array 62 and trailing microjet array 60 have been actuated to create first oblique shock 30 and second oblique shock 32 respectively. Again, the pressure ratios for each array are adjusted to appropriately position the trailing edge of the oblique shock inside the inlet (since adjusting the pressure ratio will adjust the angle of the oblique shock wave within a range).

FIG. 10(C) shows even faster supersonic flow. Those skilled in the art will know that faster flow produces an oblique shock wave having a greater shock angle. Thus, in order to appropriately position the first oblique shock, it may be necessary to turn off the middle microjet array and turn on leading microjet array 64. The reader will thereby appreciate that (1) selecting an appropriately positioned microjet array allows gross manipulation of the position of the resulting oblique shock wave; (2) adjusting the pressure ratio across the selected microjet array allows fine manipulation of the oblique shock by adjusting the shock angle. Using these techniques a wide variety of flow control is possible, while retaining the shock waves inside the engine inlet (The same techniques can be used for modifying the flow over a surface protuberance as well).

Microjet arrays are shown in the intake area of FIG. 10, but the reader should bear in mind that additional arrays could be placed further into the inlet. Some might even be placed in the subsonic flow regions in order to minimize flow separation under certain conditions. Similarly, the use of this technique can help reduce the strong shock boundary layer interactions and the associated flow unsteadiness and pressure recovery losses that occur in more traditional inlet designs.

Traditional moving inlet geometry (such as ramps, diverters, etc.) can be visible to radar. The microjet plumes, on the other hand, are not visible to radar. This feature represents a significant advantage for flow manipulation.

Those skilled in the art will realize that the microjets can be placed under automatic control. Flow sensors (such as pressure and temperature transducers) can be placed along a surface (such as within an engine inlet or upstream from a protuberance). These can provide flow data to a controlling computer.

A valve assembly is preferably provided for each microjet or array of microjets. In its simplest form, this could be an on/off valve. However, it is preferable to include a throttling valve which can adjust the pressure ratio across the microjet or microjets. The throttling and on/off valves could be the same valve in some embodiments.

The controlling computer preferably receives information from the flow sensors and uses that information to control the valve assembly or assemblies controlling the microjet or microjets. As one example, the controlling computer may detect that a strong oblique shock is being formed by flow around a protuberance. The computer would then selectively activate one or more microjets upstream of the protuberance in order to create a series of small oblique shocks rather than a single large one.

The microjets can be positioned and oriented to inject flow in a direction which is substantially perpendicular to the surface undergoing the flow, the flow itself, or something in between. In some circumstances it may be desirable to use a non-perpendicular injection as well.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Accordingly, the present invention is not limited to the specific embodiments illustrated herein, but is limited only by the claims.

The invention claimed is:

1. A method of controlling shock waves formed by a protuberance on a surface which is subjected to a supersonic flow of compressible gas, comprising:
   a. providing a microjet on said surface, said microjet being located upstream from said protuberance along said surface, with said microjet being oriented to inject a flow produced by said microjet into said supersonic flow;
   b. providing a supply of compressed gas to said microjet, with said supply of compressed gas being related to the ambient pressure of said supersonic flow of said compressible gas by a pressure ratio;

c. providing a control valve for selectively turning on and off said microjet;
d. turning on said microjet;
e. setting said pressure ratio so that said microjet creates an oblique shock wave of a desired strength upstream from said protuberance, thereby modifying said shock wave formed by said protuberance;
f. providing a pressure sensor proximate said protuberance for sensing the formation of a shock wave by said protuberance;
g. providing a control computer, wherein said control computer monitors said pressure sensor and selectively activates said control valve;
h. automatically activating said control valve to turn on said microjet when said pressure sensor senses the formation of said shock wave by said protuberance;
i. providing a pressure ratio sensor capable of measuring said pressure ratio across said microjet;
j. providing said control valve with a throttling function capable of varying said pressure ratio; and
k. wherein said control computer monitors said pressure ratio sensor and controllably actuates said throttling function to adjust said pressure ratio.

2. A method of controlling shock waves formed by a protuberance on a surface which is subjected to a supersonic flow of compressible gas, comprising:
 a. providing a microjet on said surface, said microjet being located upstream from said protuberance along said surface, with said microjet being oriented to inject a flow produced by said microjet into said supersonic flow;
 b. providing a supply of compressed gas to said microjet, with said supply of compressed gas being related to the ambient pressure of said supersonic flow of said compressible gas by a pressure ratio;
 c. providing a control valve assembly for adjusting said pressure ratio; and
 d. setting said pressure ratio so that said microjet creates an oblique shock wave of a desired strength upstream from said protuberance;
 e. providing a pressure sensor proximate said protuberance for sensing the formation of a shock wave by said protuberance;
 f. providing a control computer, wherein said control computer monitors said pressure sensor and selectively activates said control valve assembly;
 g. automatically activating said control valve assembly to turn on said microjet when said pressure sensor senses the formation of said shock wave by said protuberance;
 h. providing a pressure ratio sensor capable of measuring said pressure ratio across said microjet;
 i. providing said control valve assembly with a throttling function capable of varying said pressure ratio; and
 j. wherein said control computer monitors said pressure ratio sensor and controllably actuates said throttling function to adjust said pressure ratio.

* * * * *